Aug. 4, 1959  M. L. FOUASSIN  2,898,541
PRESET SERVO SYSTEM
Original Filed May 1, 1953  3 Sheets-Sheet 1
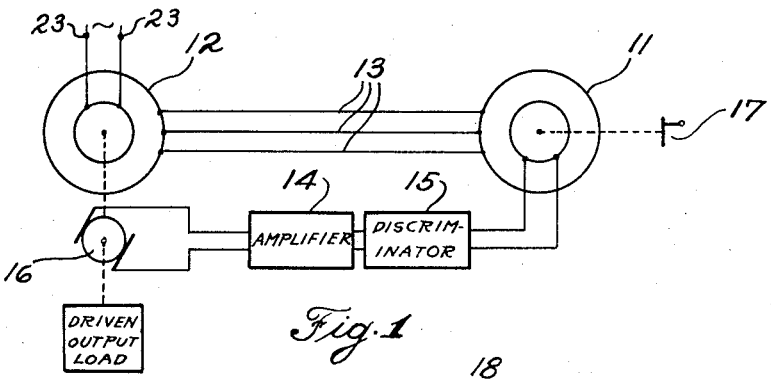
Fig. 1
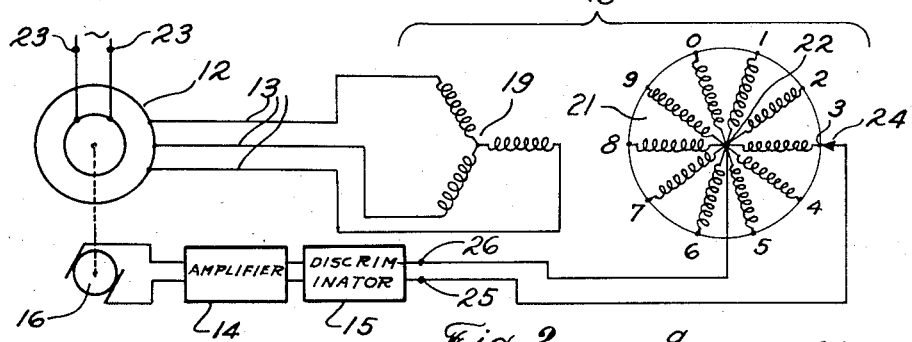
Fig. 2
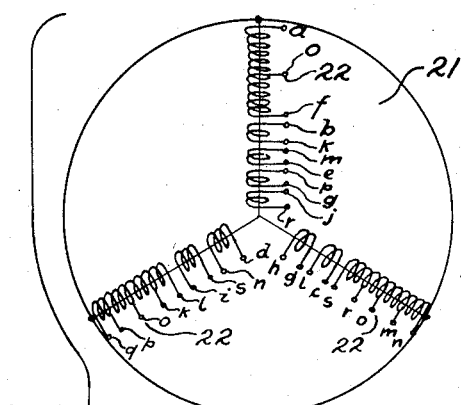
Fig. 3
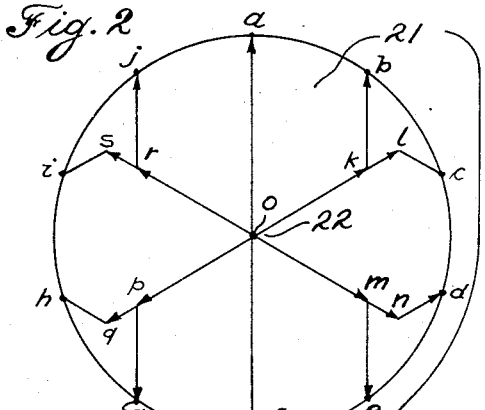
Fig. 4
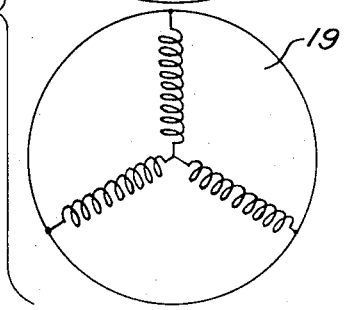
INVENTOR.
MARCEL FOUASSIN
BY
RICHEY, WATTS, EDGERTON & McNENNY
Frederic B. Schramm
ATTORNEYS

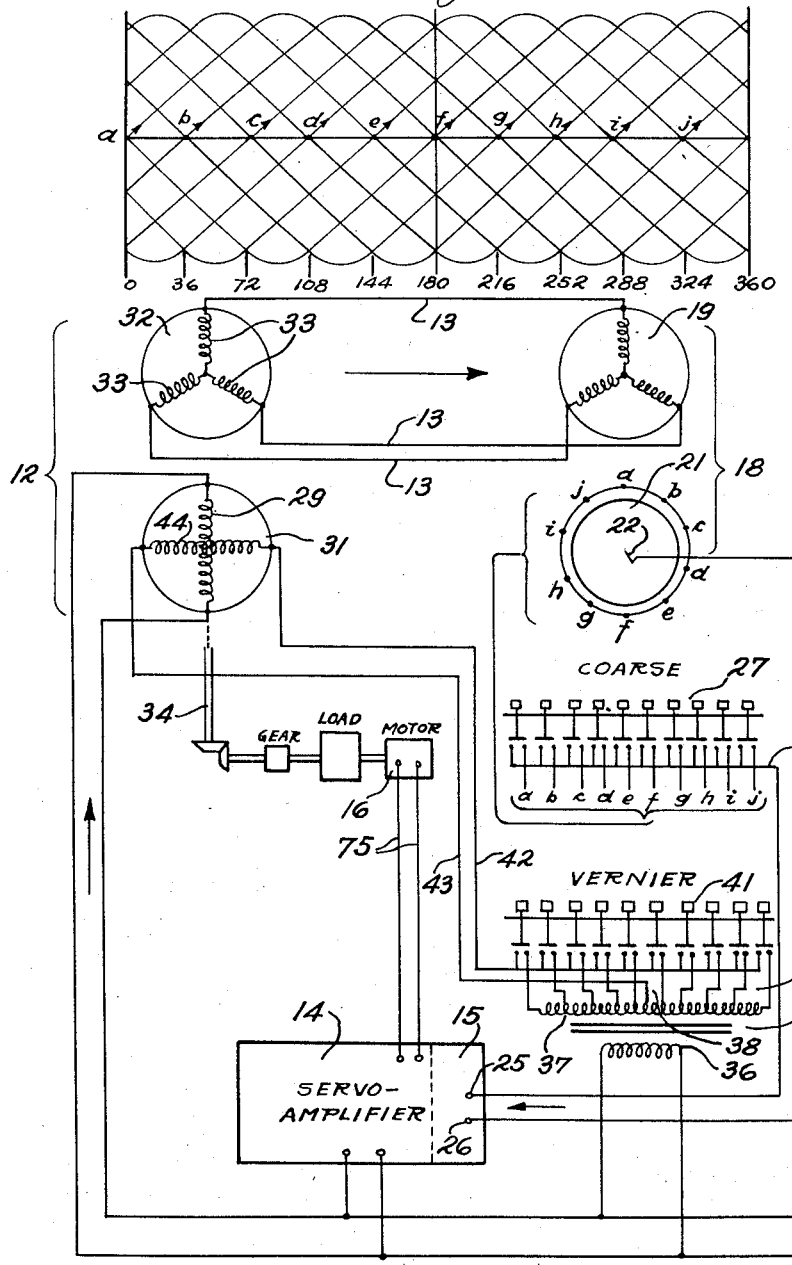

Aug. 4, 1959
M. L. FOUASSIN
2,898,541
PRESET SERVO SYSTEM
Original Filed May 1, 1953
3 Sheets-Sheet 3
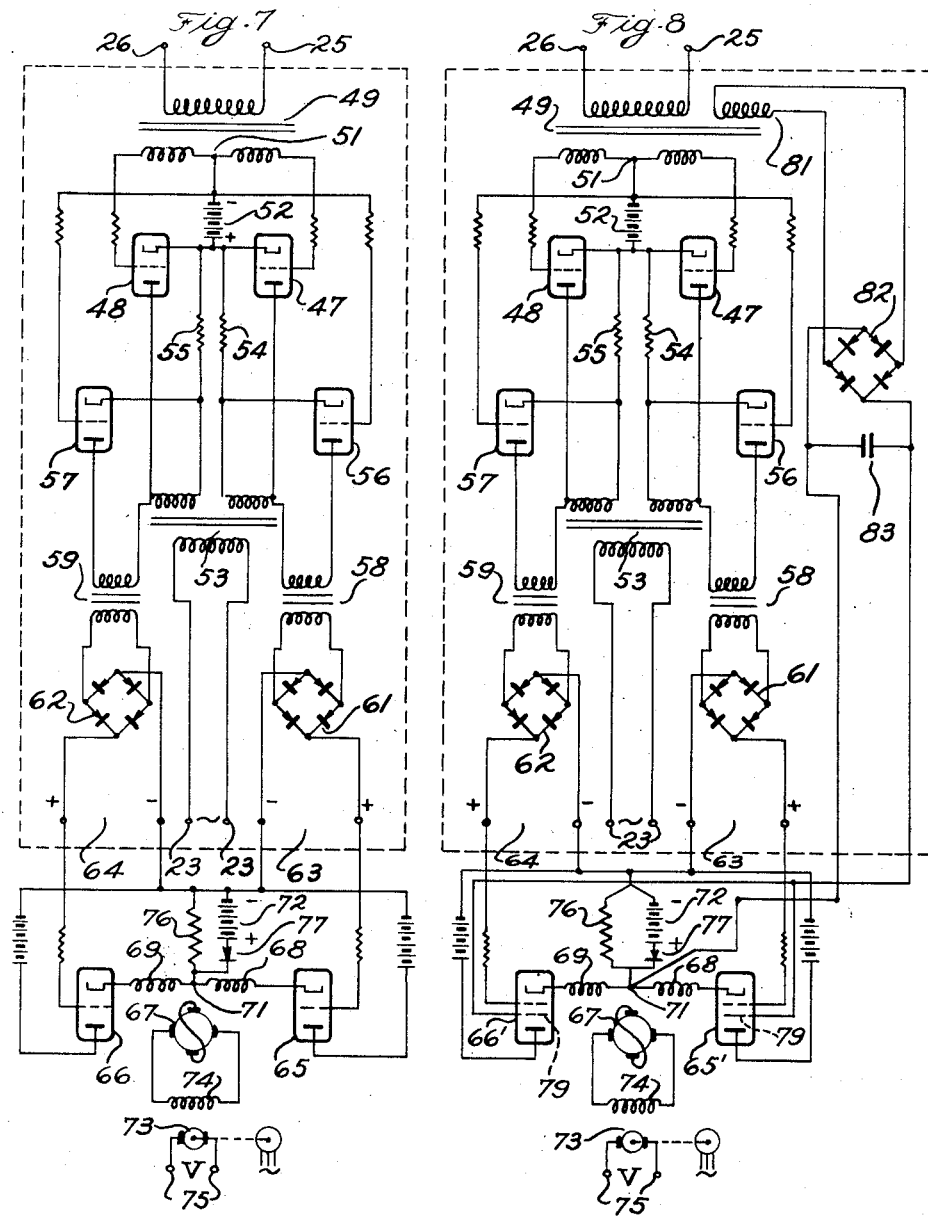
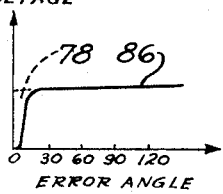
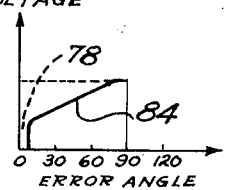
INVENTOR.
MARCEL FOUASSIN
BY
RICHEY, WATTS, EDGERTON & McNENNY
ATTORNEYS

United States Patent Office 2,898,541
Patented Aug. 4, 1959

2,898,541

PRESET SERVO SYSTEM

Marcel L. Fouassin, Liege, Belgium, assignor to Ateliers de Constructions Electriques de Charleroi, Brussels, Belgium, a company of Belgium Original application May 1, 1953, Serial No. 352,472, now Patent No. 2,783,422, dated February 26, 1957. Divided and this application December 4, 1956, Serial No. 638,668

4 Claims. (Cl. 322—73)

This application is a division of my co-pending application, Serial No. 352,472, filed May 1, 1953, now Patent 2,783,422.

My invention relates to remote positioning systems or follow-up systems particularly those employing servomotors and amplifiers.

It is an object of my invention to provide improved remote positioning systems in which exceedingly fine position adjustment of heavy apparatus may be made by means of relatively light, small, compact control apparatus, employing light mechanical parts, and in which weak electrical currents are carried in the portion of the apparatus at the transmitting or control station.

Another object of the invention is to provide rapid readjustment of the position from one angle to another through wide angles without a sacrifice of precision or fineness of adjustment. A further object is to provide improved error anticipation and to overcome overshoot and hunting, as well as backlash effects.

Still another object of the invention is to provide high accuracy of stopping with requisite slow down as the preset position is approached to avoid overshoot. Moreover, it is an object to obtain such operation between preset limit switch positions.

It is also an object to provide a remote positioning system suitable for controlling a servo-motor utilizing motor-generator, contactor or other conventional types of power control.

Other and further objects, features and advantages of the invention will become apparent as the description proceeds.

In carrying out the invention in a preferred form thereof a self-synchronous type of motion transmitting system or synchrorepeater system is provided in which a multiphase transformer is employed for providing signals of desired space-phase in place of a rotary type transmitter selsyn or synchro-generator or the like.

The amplifier circuits may be so arranged as to provide a flat response to the modulation voltage for different angular positions with a dead space in the response curve.

For anticipation of the angular movement, in order to minimize hunting and obtain a damping effect, an anticipation signal is supplied in suitable relation to the direction of motion. The anticipation signal may be produced by means of a D.-C. to A.-C. converter supplied by the direct-current voltage at the main direct current motor or corresponding voltage such as a tachometer voltage and supplying alternating current having a voltage varying in magnitude and polarity in relation to the D.-C. voltage.

A better understanding of the invention will be afforded by the following detailed description considered in conjunction with the accompanying drawings, in which:

Fig. 1 is a schematic diagram illustrating for comparison a conventional form of remote positioning system employing selsyn units or synchrorepeaters in conjunction with a servomotor and servoamplifier;

Fig. 2 is a simplified schematic diagram illustrating roughly one of the principles involved in my improved system;

Fig. 3 is a schematic diagram of a multiphase-polyphase transformer or phase-multiplying transformer which may be employed in my system as the control signal source;

Fig. 4 is a vector diagram corresponding to Fig. 3 illustrating the connections which may be employed for producing a three-phase to ten-phase transformer in order to produce signals for ten different coarse positions;

Fig. 5 is a space-function voltage diagram illustrating the principle of operation of a multiphase transformer and illustrating the space-phase relation of voltages for different taps, voltages being plotted as a function of position;

Fig. 6 is a circuit diagram (schematic in part) illustrating one embodiment of my invention for remote positioning with both coarse-adjustment connecting switches and push buttons or keys and vernier connecting switches and push buttons or keys for fine adjustment, serving also as an illustration of connections in one of my multi-channel remote positioning system;

Fig. 7 is a circuit diagram of a discriminator which may form a part of the servoamplifier of Fig. 6;

Fig. 8 is a circuit diagram of a modification in the arrangement of Fig. 7 where a rising response curve is desired, instead of a flat response;

Fig. 9 is a graph illustrating the response curve of the circuit of Fig. 7;

Fig. 10 is a graph illustrating the response curve of the arrangement of Fig. 8.

Like reference characters are utilized throughout the drawing to designate like parts.

Referring to the drawings, the conventional servo system of the alternating-current, self-synchronous synchrorepeater type as illustrated in Fig. 1 consists of a selsyn or autosyn transmitter or synchrorepeater unit 11 at a control or transmitting station and a selsyn or autosyn receiver or synchrorepeater unit 12 at a controlled or receiving station. Each unit 11 and 12 constitutes a polyphase dynamo-electric device with a stator and a rotor one of which carries a polyphase winding, for example, a 3-phase winding, as indicated by the three interconnecting lines 13 and the other of which may also carry a polyphase winding, only one phase of which is ordinarily used, however, and for explanatory purposes may therefore be referred to as a single phase winding. Where relatively little torque need be produced at the controlled station, both single-phase windings may be connected to single-phase alternating-current terminals and the two rotors take up such a position that direction of magnetic-flux produced by the single phase windings is in the same relation to the polyphase windings in each unit. However, where greater torques are required and servomotors and amplifiers are needed, only one of the single-phase windings is connected to a source of single phase alternating current, and the other winding is connected to the input terminal of a servoamplifier 14 which must be phase sensitive, or have a discriminator represented separately by the box 15 in Fig. 1. There is a servomotor 16, ordinarily a direct-current motor for closer speed control purposes energized by the amplifier 14 and mechanically connected to the rotor of the synchrorepeater 12 at the controlled station. In this case, since the amplifier 14 is so arranged as to produce a signal and rotate the motor 16 whenever voltage appears at the single-phase winding connected to its input terminals, the system comes to rest with the rotors in such positions that the single phase windings are in quadrature with respect to their relationship to the polyphase windings.

The principle of operation of such a known system either with or without the servoamplifier and servomotor is well known to those skilled in the art and need not be explained further in detail, being discussed in such standard reference books as "Servomechanism Fundamentals" by Lauer, Lesnick and Matson, published by McGraw-Hill Book Company in 1947. For example a synchrorepeater system without amplifier and servomotor is schematically illustrated in Fig. 2.10 on page 31 and servo systems with synchrofollow-up links are illustrated in Figs. 2.17 and 2.18 on page 37.

In carrying out my invention I avoid the necessity for the use of a synchrorepeater or selsyn transmitter with mechanically relatively rotatable elements at the controlling station and I utilize such a synchrorepeater unit only at one end of the system, viz. at the controlled station. As illustrated in Fig. 2 in one embodiment of my remote positioning system, at the controlling station I employ a transformer 18 having a polyphase winding 19 shown for the sake of illustration as a three-phase winding, interconnected through three-phase lines 13 to the polyphase winding of the synchrorepeater unit 12. In inductive relation to the polyphase winding 19 there is another polyphase winding 21 which for the sake of convenient distinction, I shall hereinafter refer to as a multiphase winding. For reasons which will be apparent I prefer to have a greater number of phases than three in the multiphase winding 21; although, for the sake of minimizing the number of interconnecting conductors required, the polyphase winding 19 and the corresponding polyphase winding of the synchrorepeater 12 are preferably either two or three phase windings which require only three conductors, three phase windings having the advantage of more efficient utilization of space and material.

The multiphase winding 21 is so arranged as to have a plurality of tapping points designated 0 to 9, inclusive, in Fig. 2 for the sake of illustration, representing a 10-phase winding and having also a neutral point or connection brought out represented by the neutral terminal 22. In order that such a neutral point may be brought out a modified star connection is preferably employed. As it is well known to those skilled in the art, in polyphase transformers conversion from one number of phases to another may readily be obtained by suitable connections of windings where space-phase relationships between connection points differ by 30° or a multiple thereof. Other desired angular relationships may be obtained by tapping suitable intermediate points and using windings of appropriate different numbers of turns. For example, as illustrated in Fig. 3 conversion may be made from a three-phase winding 19 to a 10 phase winding 21 by interconnecting the windings and taps of the winding assembly 21 in the manner indicated by the vector diagrams of Fig. 4 which is a modified star connection having a neutral terminal O and terminals $a$, $b$, $c$, $d$, $e$, $f$, $g$, $h$, $i$ and $j$ differing successively by 36° in space phase. The numbers of turns between points of the windings designated in Fig. 3 correspond to the lengths of vectors between such points designated in Fig. 4.

It will be understood that if three-phase current were connected to the winding 19 the voltages at the points $a$, $b$, $c$, $d$, $e$, $f$, $g$, $h$, $i$ and $j$ would differ by 36° successively in time phase. The same angular space-phase relationship exists nevertheless since the power voltage appears at successive points 36° apart on the vector diagram and the concept of space relationship may therefore be employed in designating the connection points of a polyphase or multiphase winding. Since there is no polyphase energization, the concept of time phase relationship is not strictly applicable to the operation of the system. Accordingly, in the explanation hereinafter the reference to phase differences will be understood as signifying space-phase relationship.

In the system of Fig. 2 the single-phase winding of the synchrorepeater unit 12 is connected to a pair of single-phase alternating supply terminals 23. Adjustment of the angular position of the rotor is accomplished by selection of one of the phase points, 2, 2, 3, 4, 5, 6, 9, 0 on the multiphase winding 21 by means of a tap 24 connected to one on the input terminals 25 of the discriminator 15, the other input terminal 26 being connected to the neutral terminal 22 of the multiphase winding 21. If the angular position of the rotor of this synchrorepeater 12 is such as to induce currents flowing in the lines 13, which are so distributed as to cause a voltage to appear between the terminals 3 and 22, it is an indication that the rotor position is not in the angular position corresponding to the tap 24. In such a case the amplifier and servomotor 16 are energized until the rotor of the synchrorepeater 12 has been brought to the position in which no voltage appears between the terminals 3 and 22. The operation of the discriminator, amplifier, servomotor and synchrorepeater 12 in the system of Fig. 2 is analogous to the operation in Fig. 1. Control is obtained in the system of Fig. 2 by the selection of the position of the tap 24 instead of the selection of the angular position of a handle 17 which controls the angular position of the rotor of the synchrorepeater unit 11 in Fig. 1.

Inasmuch as remote positioning systems are employed primarily in cases where relatively large torques are required at the controlled station, for example, in steel mills for adjusting the screw-downs to the rolls, my invention has been illustrated and will be described in connection with the use of servoamplifiers and motors.

In the embodiment of Fig. 6, a neutral terminal 22 and the adjustable space-phase terminal 28 of the multiphase transformer 21 are connected to the input terminals 25 and 26 of the discriminator 15 of the servoamplifier 14 and the single-phase alternating-current supply terminals 23 are connected to the single phase winding 29 of the synchrorepeater unit 12. The winding 29, for the sake of illustration, is assumed to be carried by the rotor 31 of the unit 12, the stator 32 carrying polyphase windings 33 which are interconnected by the conductors 13 to the polyphase winding 19 of the transformer unit 18. The servo-motor 16, energized by the servoamplifier 14, is mechanically connected through conventional gearing or shafting 34 to the rotor 31 of the synchrorepeater unit 12.

In order to obtain a flat response to the error angle in the system, that is the difference between the angular position of the rotor of the synchrorepeater 12 and the angular position determined by the setting of the keys in the coarse and vernier keyboards 27 and 31, a discriminator such as illustrated in Fig. 7 is employed. The discriminator 15 has a pair of push-pull connected electric discharge devices 47 and 48, e.g. triodes, with input control electrodes coupled to the input signal terminal 25 and 26 with opposite polarities by a conventional coupling transformer 49 with a secondary mid-tap 51. The latter is connected through a bias voltage source represented as a battery 52 with the cathodes of the tubes 47 and 48, so as to provide negative bias for the devices 47 and 48. The plate supply to the devices 47 and 48 is through a double-secondary power transformer 53 having cathode resistors 54 and 55 interposed in the cathode connections.

Second stage electric discharge devices 56 and 57, e.g. triodes, are provided which are cathode coupled to the first stage by connecting their cathodes to the negative ends of the cathode resistors 54 and 55 of the preceding stage. The devices 56 and 57 have control-electrode connections to a common negatively biased point, namely the negative terminal of the bias-voltage source 52, which is at the secondary center tap of the coupling transformer 49. The tubes 47 and 48 are biased to cut off so that only one or the other is conducting at any instant and the cut off bias is sufficient so that no plate current flows until a small predetermined error angle represented by a predetermined minimum input signal at the terminals 25 and 26 has been reached, as illustrated by the graph of Fig. 9. The discharge devices 56 and 57 are also biased to cut off and the constants are so arranged that the electric discharge devices operate through the range from cut-off to zero grid bias, high resistance grid resistors being provided to limit grid current, so that a flat response is obtained as illustrated in Fig. 9. The dead zone 78 is adjusted by adjustment of the grid bias 52, shown for simplicity as a battery. The output from the discharge devices 56 and 57 may be obtained through anode coupling transformers 58 and 59 to which full wave rectifier unit 61 and 62 are connected so that an output signal appears at one or the other of two pairs of output terminals 63 and 64.

A servoamplifier is provided comprising a pair of power electric discharge devices 65 and 66, e.g. triodes, each having a conventional anode supply and having a control electrode coupled to one of the pair of output terminals 63 or 64 of the discriminator 15. The electric discharge devices 65 and 66 also have connections such that the polarity of the output current is determined by whichever of the discriminator output terminals 63 and 64 is energized. In the specific arrangement shown the amplifier output is taken from the cathodes and a dynamo electric amplifier is utilized for obtaining further amplification. As shown there is a dynamo electric amplifier 67 of the amplidyne type having a pair of oppositely connected field windings 68 and 69, and a common terminal 71 connected to the positive terminal of a bias voltage source 72, the field windings 68 and 69 being connected in series with the cathodes of the amplifier devices 65 and 66, respectively. As in conventional amplidyne-controlled Ward Leonard systems there is a direct-current generator 73 having a field winding 74 energized by the amplidyne device 67 with a strength and polarity determined by the currents flowing in the amplidyne field windings 68 and 69. The Ward Leonard generator 73 has its armature connected to output terminals 75 serving as the output terminals of the servoamplifier 14 which are connected to the load-driving motor 16.

In order to permit the bias of electric discharge devices 65 and 66 to increase but not to fall below a predetermined level determined by the voltage of the source 72 a cathode resistor 76 is provided to which the source 72 is connected through a rectifier 77. In this manner the amplifier response is further flattened.

Where a response curve is desired having a dead section such as the area 78 of the graph Fig. 9 but with a linear rising characteristic instead of a flat characteristic a discriminator and power amplifier circuit such as that of Fig. 8 may be employed. In this case the discriminator is connected exactly as shown in Fig. 7. The power amplifier electric discharge devices 65 and 66 of Fig. 7, however, are replaced by devices 65' and 66' having two control electrodes instead of one. The corresponding control electrodes of the devices 65' and 66' are connected in the same manner as the single control electrode of devices in Fig. 7. For energizing the added control electrodes 79, however, a source of unidirectional control voltage proportional to the amplitude of the input signal is provided. For example, this may take the form of an additional winding 81 on the coupling transformer 49 of Fig. 7 to which is connected a full wave rectifier 82 with output terminals having a filter condenser 83 connected thereacross. The negative terminal is connected to the positive point of the bias supply source, e.g. at the positive end of the cathode resistor 76 of the servo-amplifier devices 65' and 66', and the positive terminal is connected to the second control electrodes 79 thereof. Since the electric discharge devices of the circuit of Fig. 8 are biased to cut off in the same manner as Fig. 7, a dead area 78 is provided as in Fig. 9. However, as illustrated in Fig. 10, beyond this point there is a linear rising portion 84 of the output characteristic as a result of the rise of potential of the control electrode 79 with the increase in amplitude of the input signal.

While the invention has been described as embodied in concrete form and as operating in a specific manner in accordance with the provisions of the Patent Statutes, it should be understood that the invention is not limited thereto, since various modifications will suggest themselves to those skilled in the art without departing from the spirit of the invention.

What is claimed is:

1. A discriminator for a servoamplifier of a remote positioning system of the synchrorepeater type comprising a pair of push pull connected electric discharge devices with input signal means for applying signals of opposite polarity to the electric discharge devices, a second stage pair of electric discharge devices also push-pull connected, cathode coupled to the first stage electric discharge devices and having output coupling means with rectifying means in the output circuits, at least one stage being biased to cut off, and at least one operating substantially up to zero grid bias whereby a signal in one rectifier or the other is produced according to the polarity of input signal and rising in amplitude to a flat response value independent of the amplitude of the input signal.

2. An amplifier comprising a discriminator as described in claim 1 including an amplidyne type of electric amplifier having a pair of reversely poled field windings each connected to one of the rectifier means of the discriminator circuit.

3. A rising response phase-sensitive amplifier comprising in combination a push-pull connected discriminator with output connections at one or the other of which a voltage appears according to the phase of the input signal, a pair of electric discharge devices each having a pair of control electrodes, one of the control electrodes of each discharge device being connected to one of the output connections of the discriminator, a rectifier having input connections for energization by the input signal of the discriminator, and having output connections, the second control electrodes of the electric discharge devices being connected in parallel to the output connection of the rectifier, whereby increasing intensity of the input signal produces greater amplification of the said latter electric discharge devices and an output signal is produced in one or the other of the latter discharge devices depending on the phase of the input signal, increasing within the operating range according to the intensity of the input signal.

4. A discriminator for a servo-amplifier of a remote positioning system of the synchrorepeater type comprising a pair of push-pull connected electric discharge devices with input signal means for applying signals of opposite polarity to the electric discharge devices, a second stage pair of electric discharge devices also push-pull connected, cathode coupled to the first stage electric discharge devices and having output coupling means with rectifying means in the output circuits, whereby a signal in one rectifier or the other is produced according to the polarity of the input signal.

References Cited in the file of this patent
UNITED STATES PATENTS 2,429,771    Roberts _____ Oct. 28, 1947
2,579,001    Jeffers _____ Dec. 18, 1951